June 2, 1925.

F. DRUGAN

SUCTION FLYTRAP

Filed Oct. 29, 1924

1,540,518

INVENTOR
Fredrich Drugan
BY
ATTORNEY

Patented June 2, 1925.

1,540,518

UNITED STATES PATENT OFFICE.

FREDRICH DRUGAN, OF NEW HAVEN, CONNECTICUT.

SUCTION FLYTRAP.

Application filed October 29, 1924. Serial No. 746,497.

*To all whom it may concern:*

Be it known that I, FREDRICH DRUGAN, a citizen of Poland, residing at New Haven, in the county of New Haven and State of Connecticut, have invented certain new and useful Improvements in Suction Flytraps, of which the following is a specification.

This invention relates generally to flytraps, the invention having for an object to provide a novel and improved type of flytrap in the operation of which the flies are drawn by a suction device into a suitable compartment.

For further comprehension of the invention, and of the objects and advantages thereof, reference will be had to the following description and accompanying drawing, and to the appended claims in which the various novel features of the invention are more particularly set forth.

Figure 1:
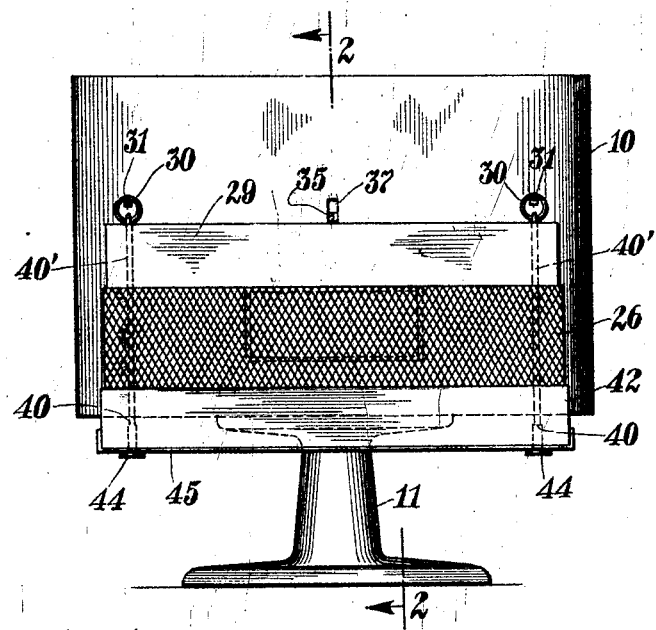

Fig. 1 of the drawing is an end view of my improved flytrap.

Figure 2:
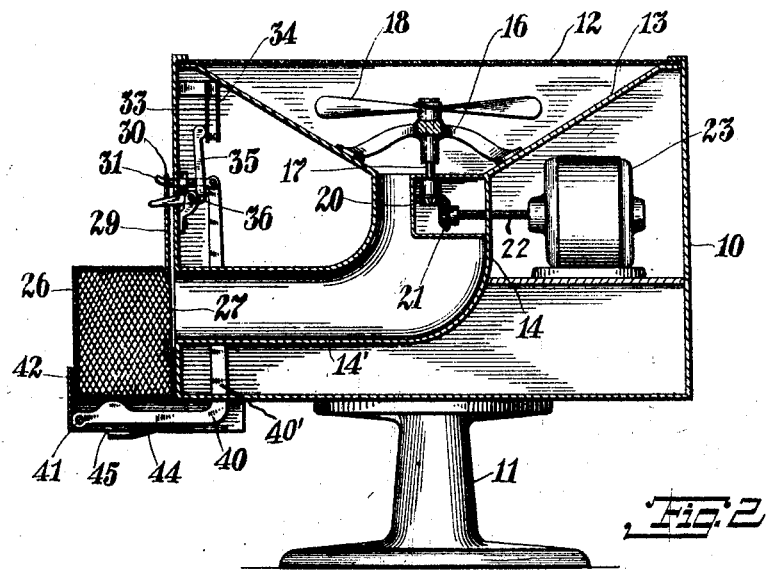

Fig. 2 is a vertical sectional view thereof taken on the line 2—2 of Fig. 1.

As here embodied my improved flytrap comprises a rectangular casing or box 10 that is mounted on a pedestal 11. The top wall member of this box is in the form of a screen 12 and from the top edges of the box a funnel-like member 13 depends. Leading downward from the lower end of the funnel is a conduit 14 that turns laterally as at 14' to communicate with an opening in the end of the box. Supported by a bearing bracket 16 in the funnel is a short vertical shaft 17 having a helical fan 18 on its upper end. Fixed to the lower end of this shaft is a bevel pinion 20 that meshes with a like pinion 21 on one end of the rotor shaft 22 of an electric motor 23 supported within the box and which serves to drive the fan. It will be understood that the mesh of the screen 12 is of sufficient size to allow of the flies being sucked therethrough by the fan and blown into the conduit 14.

The flies are discharged from the conduit 14 into a box or receptacle 26 that is preferably of wire mesh of sufficient fineness and that abuts at one side against the end of the box or casing 10, this side of the receptacle being formed with an opening 27 that registers with the end of the conduit 14. The opening 27 in the receptacle 26 is adapted to be closed, when the receptacle is to be removed for disposal of the flies, by means of a vertically slidable door 29 that is held in its raised or open position by means of a pair of rings 30 attached to its upper edge that are engaged over pins 31 projecting from the wall of the box 10. The motor 23 is controlled by a switch comprising the normally separated contact members 33 and 34 which are closed by engagement of a bell crank lever 35 with one of them when the door is opened, this lever being fulcrumed as at 36 inside the box and having one arm projecting through a vertical slot 37 in the end wall of the box to be engaged by the top of the door 29 when the latter is raised and hung from the pins 31.

In connection with my improved trap I preferably provide means whereby the door 29 is closed and the motor 23, stopped when the receptacle 26 becomes filled with flies. As here shown the receptacle rests freely on a pair of levers 40, that are fulcrumed at one end as at 41 and that extend transversely under the receptacle, the latter being guided for free vertical movement by a wall element 42 attached to the box 10. The levers 40 are supported by springs 44 that are fixed at one end to a crossbar 45 and that bear upwardly at their other ends on the levers. These levers are formed with upward extensions 40' that project through suitable slots in the bottom of the box 10 and have the inner ends of the pins 31 before mentioned pivotally connected to their upper ends. As will be apparent when the weight of the receptacle is increased sufficiently by flies deposited on its wall it will depress the levers 40 and cause the pins 31 to be withdrawn from the rings 30 thereby allowing the door 26 to fall to closed position and also removing the support from the lever 35 so that the switch members 33 and 34 are opened. Downward movement of the levers may be limited by the crossbar 45.

Having thus described my invention, what I claim as new and desire to protect by Letters Patent of the United States is as follows:

1. A flytrap comprising a screen-topped box, a funnel leading downward from the top of the box, a conduit leading from said funnel to the side of the box, a helical fan in said funnel, and a motor in said box for driving said fan, and a removable receptacle abutting against the side of the box with which said conduit communicates.

2. A flytrap comprising a screen-topped box, a funnel leading downward from the top of the box, a conduit leading from said funnel to the side of the box, a helical fan in said funnel, and a motor in said box for driving said fan, and a removable receptacle abutting against the side of the box with which said conduit communicates, said receptacle being formed with an aperture in its side provided with a vertically sliding door.

3. A flytrap comprising a screen-topped box, a funnel leading downward from the top of the box, a conduit leading from said funnel to the side of the box, a helical fan in said funnel, and a motor in said box for driving said fan, and a removable receptacle abutting against the side of the box with which said conduit communicates, said receptacle being formed with an aperture in its side provided with a vertically sliding door, means suspending said door in raised position, a switch controlling said motor, and a lever engaged by said door when in raised position and acting to retain said switch closed.

4. A flytrap comprising a screen-topped box, a funnel leading downward from the top of the box, a conduit leading from said funnel to the side of the box, a helical fan in said funnel, and a motor in said box for driving said fan, and a removable receptacle abutting against the side of the box with which said conduit communicates, said receptacle being formed with an aperture in its side provided with a vertically sliding door, means suspending said door in raised position, a switch controlling said motor, and a lever engaged by said door when in raised position and acting to retain said switch closed, a resilient support for said door, and an operative connection between said support and the said door suspension means whereby the latter is withdrawn from operative position when the said support is depressed.

5. A flytrap comprising a box having one side open to form an entrance opening, a conduit leading through the box and communicating at its other end with a vertical wall of the box, a fan in said conduit, an electric motor for driving said fan, a receptacle abutting against the said vertical wall and having an opening in its side wall registering with the end of said conduit, a pair of resiliently supported levers on which said receptacle rests freely, a vertically slidable door controlling the opening in the said receptacle, a pair of pins movable in the wall of the box from which said door is suspended, and upward extensions from said levers connected to said pins whereby the latter are withdrawn from operative position when the said levers are depressed sufficiently.

6. A flytrap comprising a box having one side open to form an entrance opening, a conduit leading through the box and communicating at its other end with a vertical wall of the box, a fan in said conduit, an electric motor for driving said fan, a receptacle abutting against the said vertical wall and having an opening in its side wall registering with the end of said conduit, a pair of resiliently supported levers on which said receptacle rests freely, a vertically slidable door controlling the opening in the said receptacle, a pair of pins movable in the wall of the box from which said door is suspended, and upward extensions from said levers connected to said pins whereby the latter are withdrawn from operative position when the said levers are depressed sufficiently, a switch controlling the said motor, and a lever having one end adapted to engage the said switch to retain it closed, and the other end adapted to be engaged by said door when the latter is in raised position.

In testimony whereof I have affixed my signature.

FREDRICH DRUGAN.